United States Patent
Wang He (10) Patent No.: US 8,500,319 B2
(45) Date of Patent: Aug. 6, 2013

(54) LIGHT SOURCE MODULE AND ILLUMINATING DEVICE

(75) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 41 days.

(21) Appl. No.: 13/397,701

(22) Filed: Feb. 16, 2012

(65) Prior Publication Data

US 2013/0128577 A1    May 23, 2013

(30) Foreign Application Priority Data

Nov. 17, 2011 (TW) .............................. 100141948 A (51) Int. Cl.
*F21V 7/04* (2006.01)
(52) U.S. Cl.
USPC ............................ 362/626; 362/606; 362/237
(58) Field of Classification Search
USPC .......................... 362/600–634, 244, 242, 237
See application file for complete search history.

(56) References Cited

U.S. PATENT DOCUMENTS

| | | | | |
|---|---|---|---|---|
| 7,806,567 B2 * | 10/2010 | Chen | ....................... | 362/311.06 |
| 7,806,580 B2 * | 10/2010 | Lin | ............................... | 362/606 |
| 2005/0174807 A1 * | 8/2005 | Yu et al. | ....................... | 362/626 |
| 2006/0239028 A1 * | 10/2006 | Yao et al. | ..................... | 362/606 |
| 2008/0158912 A1 * | 7/2008 | Chang et al. | ................. | 362/628 |
| 2011/0216267 A1 * | 9/2011 | Miyamoto et al. | ............. | 349/62 |
| 2013/0021812 A1 * | 1/2013 | Schug et al. | ................. | 362/487 |

* cited by examiner

*Primary Examiner* — Anne Hines
(74) *Attorney, Agent, or Firm* — Altis Law Group, Inc.

(57) ABSTRACT

A light source module includes a housing receiving a light source. The housing includes a transparent light emitting plate with a micro structure positioned on an outer surface thereof. The micro structure includes a number of first and second light guide projectors. The first light guide projectors are positioned at a middle part of the outer surface, the second light guide projectors are positioned at two end parts of the outer surface. The first and second light guide projectors extend along the outer surface and are perpendicular to each other, cross-sectional surfaces of the first light guide projectors perpendicular to the extending direction of the first light guide projectors are semi-circular-shaped, and cross-sectional surfaces of the second light guide projectors perpendicular to the extending direction of the second light guide projectors are triangular-shaped. An illuminating device including the light source module is also provided.

10 Claims, 10 Drawing Sheets

LIGHT SOURCE MODULE AND ILLUMINATING DEVICE

BACKGROUND

1. Technical Field

The present invention generally relates to a light source module and an illuminating device using the light source module.

2. Description of Related Art

Light guide plates are often used to expand a number of point light sources to an area light source. However, light can leak through gaps existing between the point light sources and the light guide plates. This reduces the luminosity of the area light source. Furthermore, light emitted from the point light sources is usually centralized. This can cause bright spots existing on the light guide plates.

What is needed, therefore, is a light source module and an illuminating device, which could overcome the limitations described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
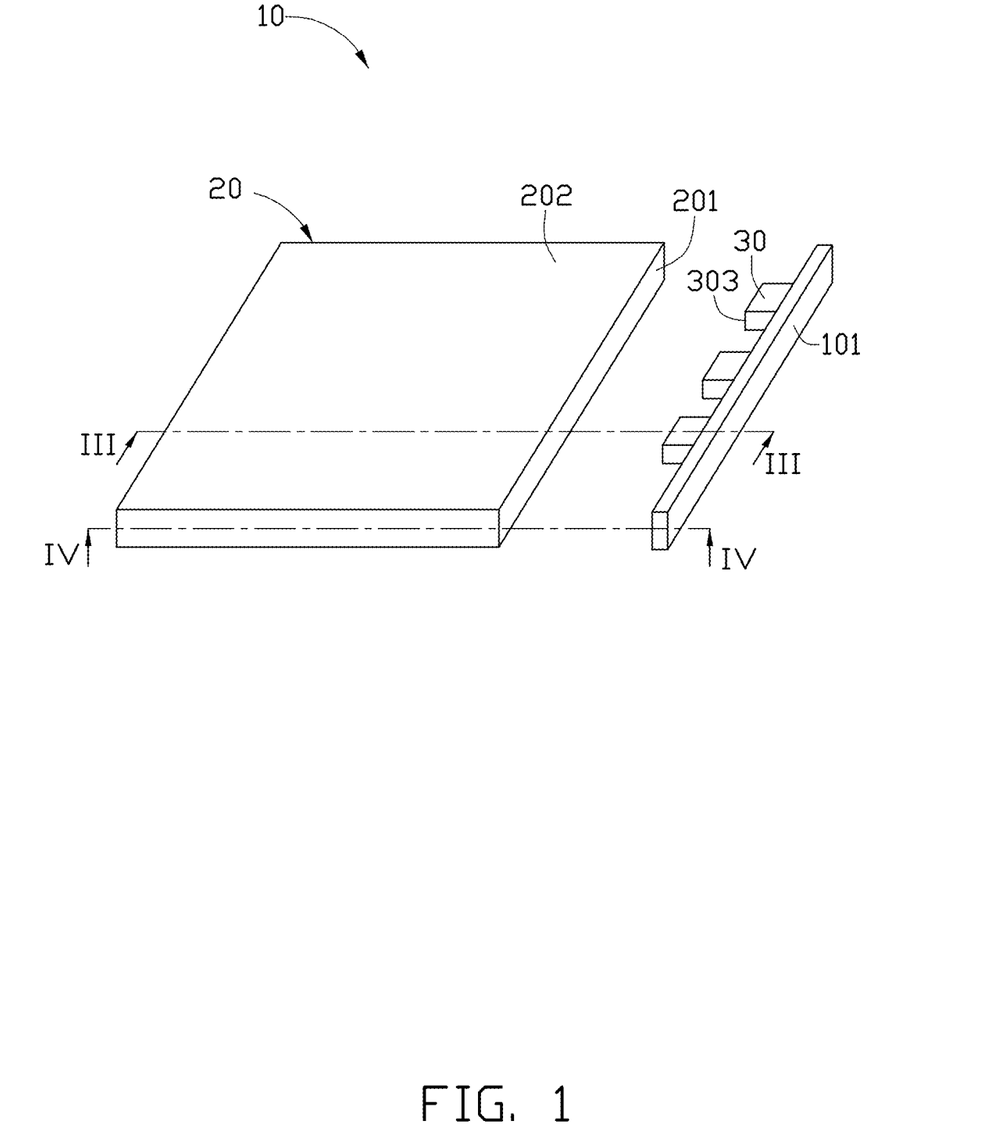
FIG. 1 is a sectional view of an illuminating device according to an embodiment, the illuminating device including a number of light source modules, each of which includes a transparent light emitting plate.

Referring to FIG. 1, an illuminating device 10 according to an embodiment is shown. The illuminating device 10 includes a light guide plate 20. The light guide plate 20 is made of polymethylmethacrylate (PMMA), polycarbonate (PC) or other transparent material. The refractive index of the light guide plate 20 is in the range of about 1.47 to about 1.55. The light guide plate 20 includes a light incident surface 201 and a light emitting surface 202. In the embodiment, the light incident surface 201 is substantially perpendicular to the light emitting surface 202. In the illustrated embodiment, the light incident surface 201 is a side surface of the light guide plate 20, the light emitting surface 202 is the top surface of the light guide plate 20. The area of the light emitting surface 202 is bigger than the area of the light incident surface 201.

The illuminating device 10 further includes a number of light source modules 30. The light source modules 30 are positioned on a circuit board 101 and adjacent to the light incident surface 201.

Figure 2:
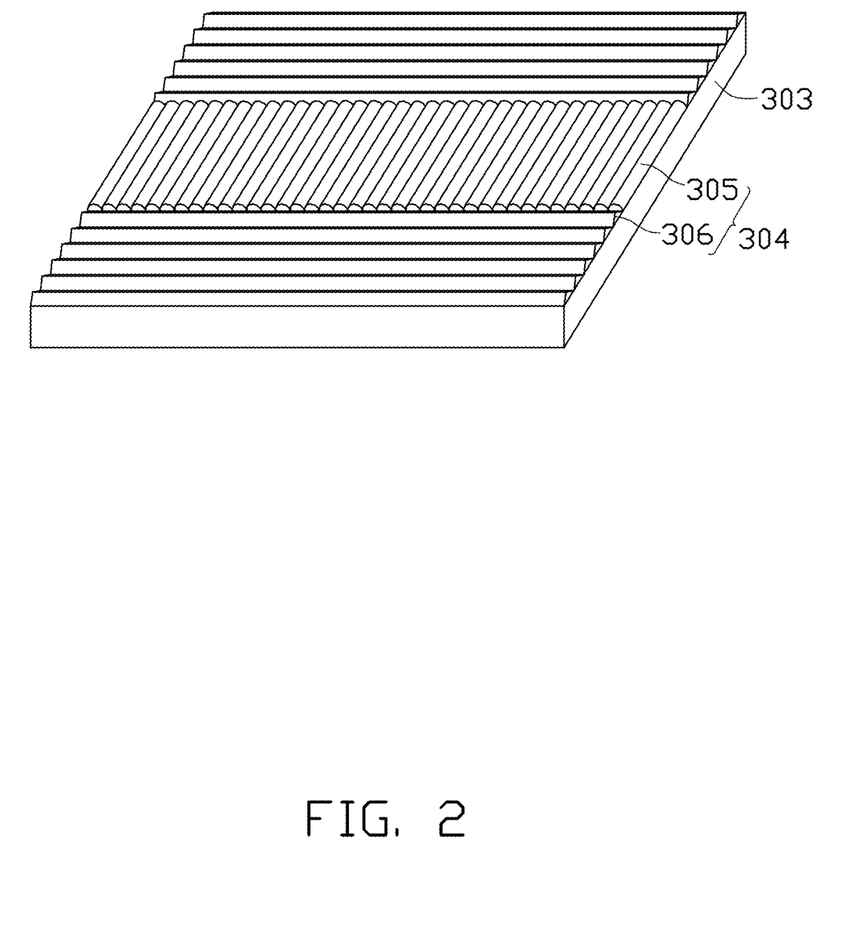
FIG. 2 is an isometric view of the transparent light emitting plate of FIG. 1.
Figure 3:
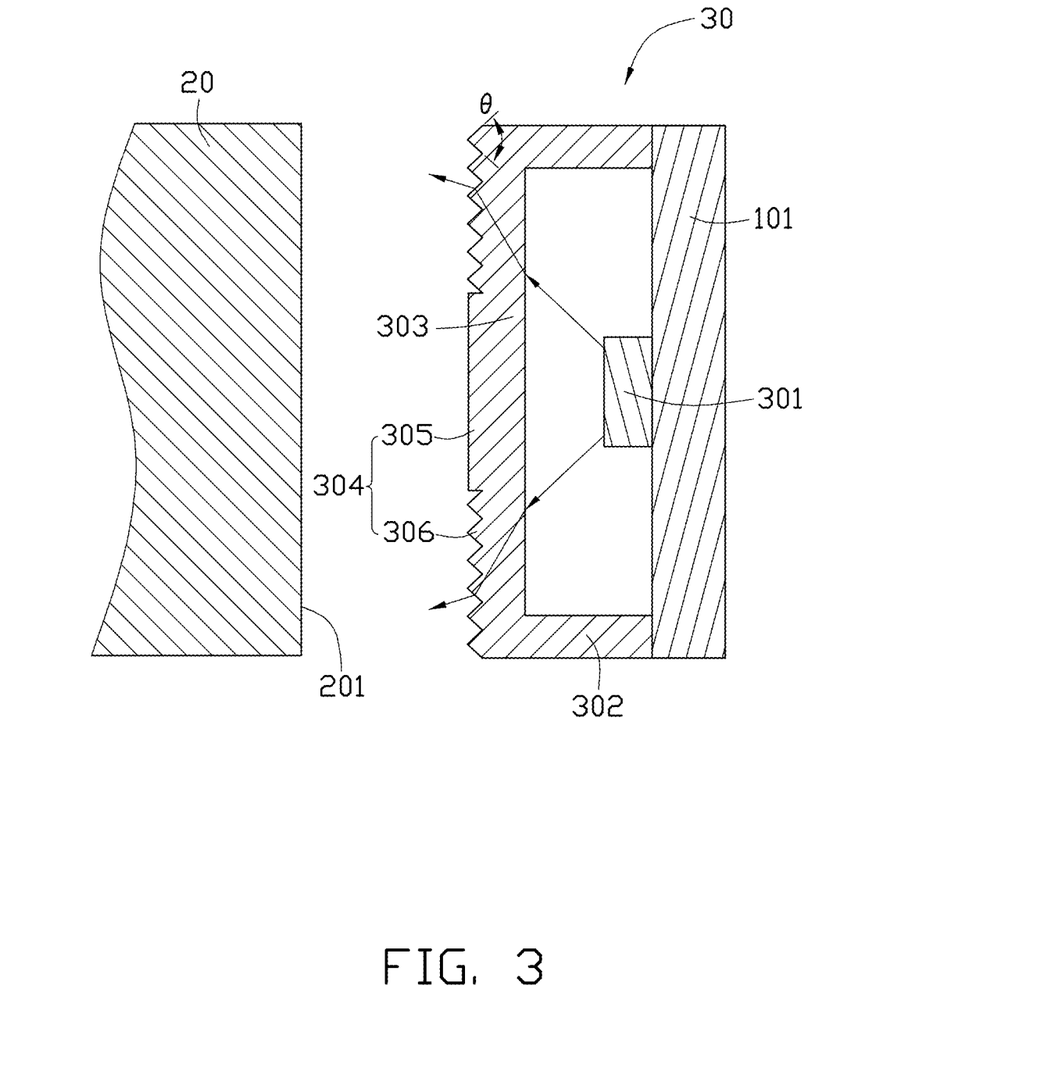
FIG. 3 is a partial, cross-sectional view of the illuminating device, taken along line III-III of FIG. 1.
Figure 4:
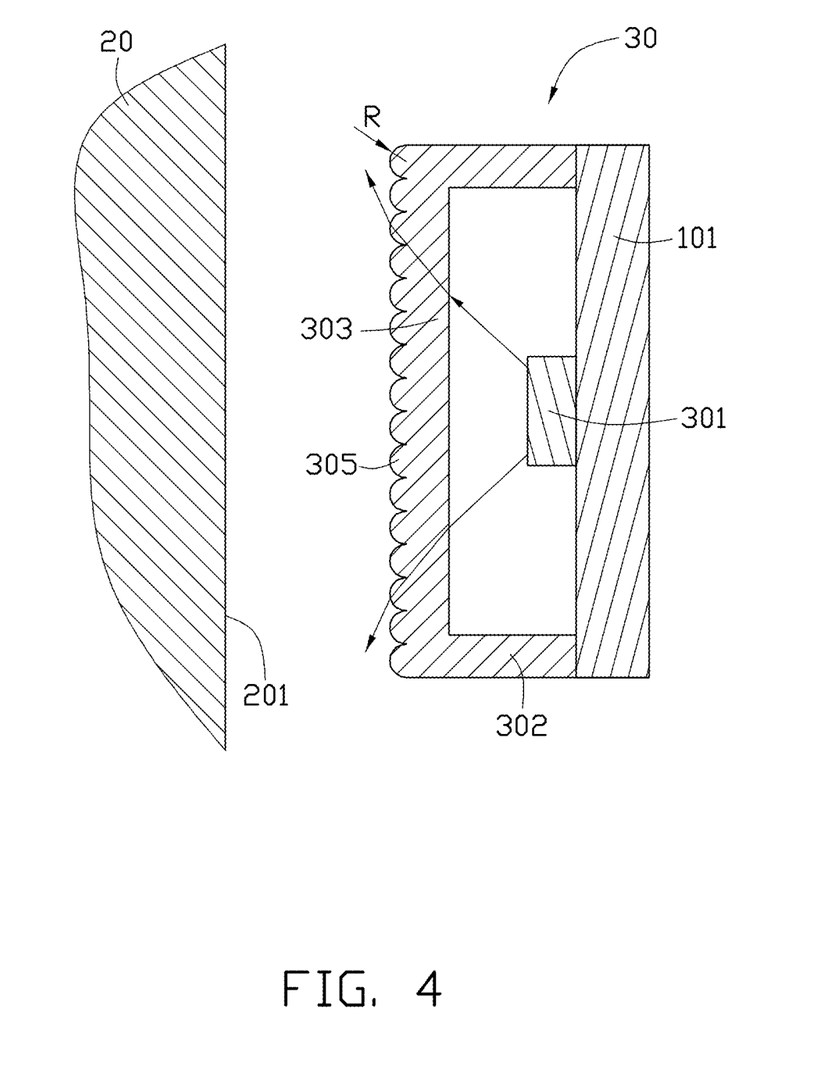
FIG. 4 is a partial, cross-sectional view of the illuminating device, taken along line IV-IV of FIG. 1.
Figure 5:
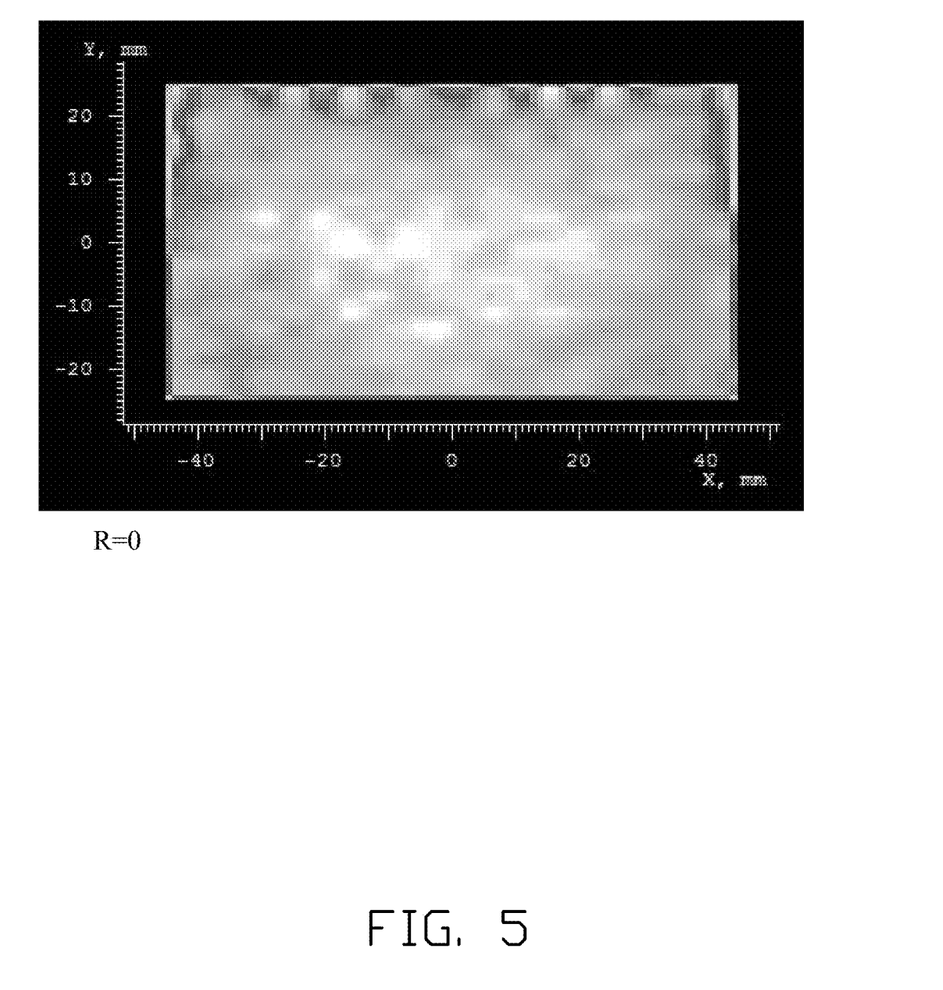
FIGS. 5-9 are diagrams showing the brightness distribution of the illuminating device of FIG. 1.
Figure 6:
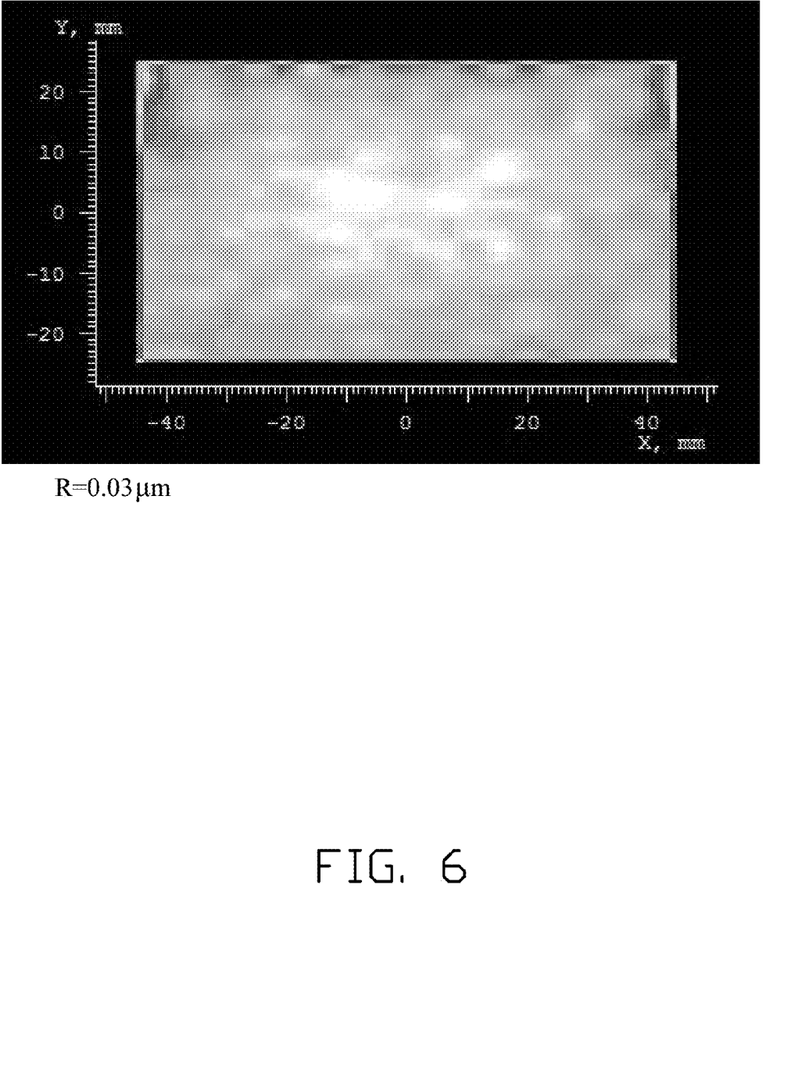
Figure 7:
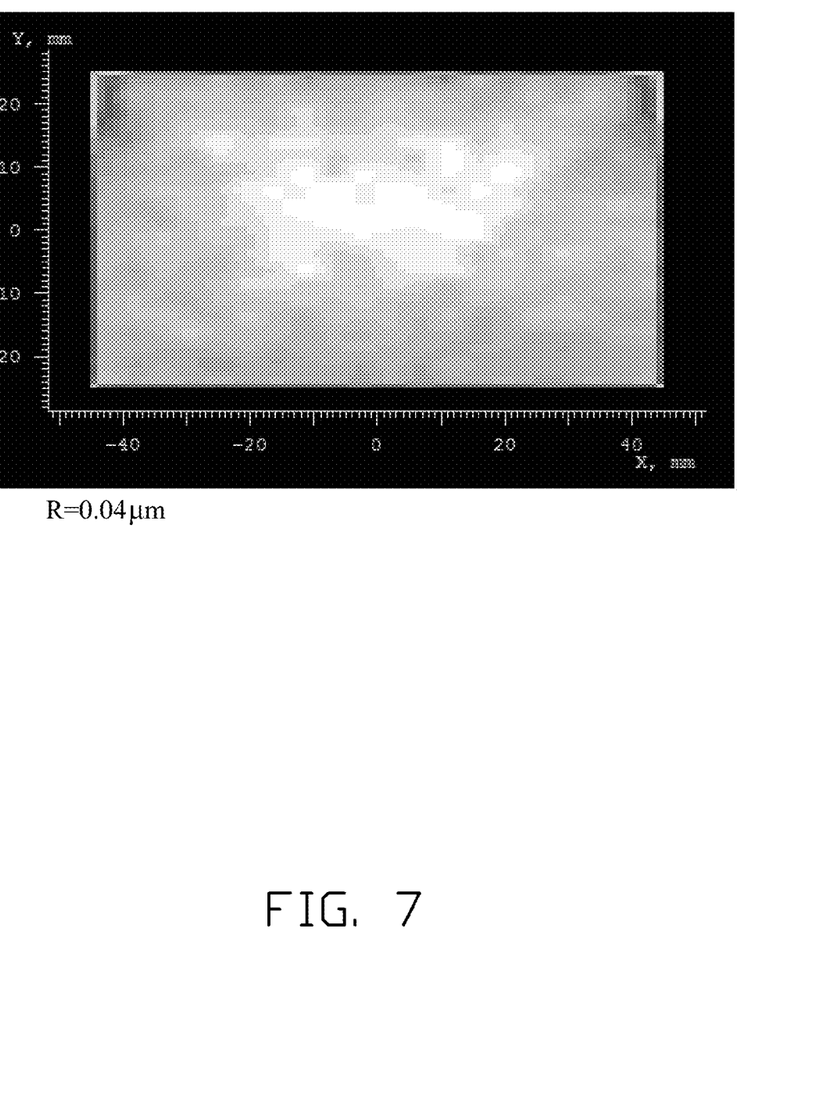
Figure 8:
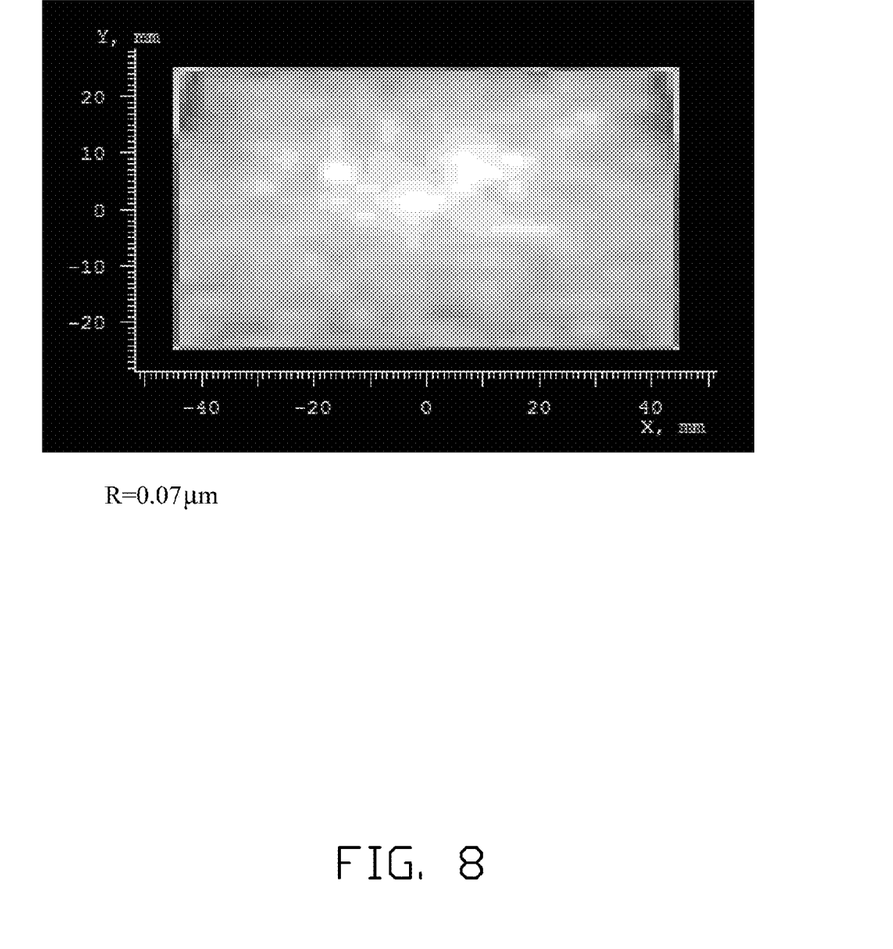
Figure 9:
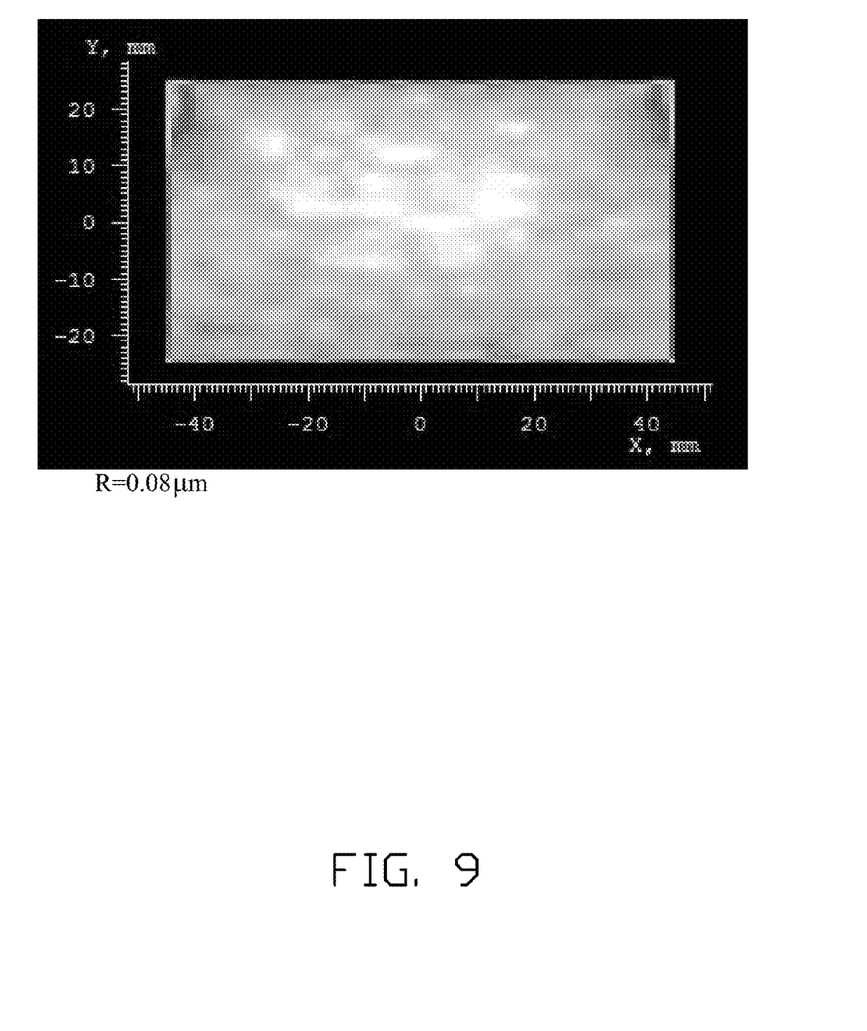

FIGS. 2 to 4 show the structure of the light source modules 30. Each light source module 30 includes a light source 301 and a housing 302. The material of the housing 302 may be the same as that of the light guide plate 20. The light source 301 is a light emitting diode (LED) and is positioned in the housing 302. The housing 302 includes a transparent light emitting plate 303 positioned between the light source 301 and the light incident surface 201.

A micro structure 304 is formed on the outer surface of the transparent light emitting plate 303 away from the light source 301. The micro structure 304 includes a number of first light guide projectors 305 and a number of second light guide projectors 306 projecting from the outer surface of the transparent light emitting plate 303. The first light guide projectors 305 are positioned at the middle part of the transparent light emitting plate 303 and correspond to the middle part of the light incident surface 201 along a direction substantially perpendicular to the light emitting surface 202. The second light guide projectors 306 are positioned on two end parts of the transparent light emitting plate 303 and correspond to the two end parts of the light incident surface 201 along a direction substantially parallel to the light emitting surface 202. The first light guide projectors 305 and the second light guide projectors 306 extend along the outer surface of the transparent light emitting plate 303 and the extending directions of the first light guide projectors 305 and the second light guide projectors 306 are substantially perpendicular to each other. In this embodiment, the first light guide projectors 305 extend along a direction substantially perpendicular to the light emitting surface 202. The second light guide projectors 306 extend along a direction substantially parallel to the light emitting surface 202.

Cross-sectional surfaces of the first light guide projectors 305 substantially perpendicular to the extending direction of the first light guide projectors 305 are semi-circular-shaped for dispersing light. In this way, light is scattered to the area between the light source modules 30, and bright pots are reduced correspondingly.

FIGS. 5-9 respectively show the brightness distribution of the illuminating device 10 when the radius R of the semi-circular-shaped sectional surfaces of the first light guide projectors 305 is changed from 0 to about 0.08 microns. It can be seen from the FIGS. 5-9 that by employing the first light guide projectors 305, the brightness of the illuminating device 10 is distributed evenly and the bright pots are reduced. It can also be seen from FIGS. 5-9 that the brightness of the illuminating device 10 is distributed more evenly when the radius R is in the range of about 0.04 microns to about 0.07 microns.

Cross-sectional surfaces of the second light guide projectors 306 substantially perpendicular to the extending direction of the second light guide projectors 306 are triangular-shaped for focusing light. In this way, the emitting angle of the light is reduced and the light is more probably transmitted to the light incident surface 201 for reducing light leak.

Figure 10:
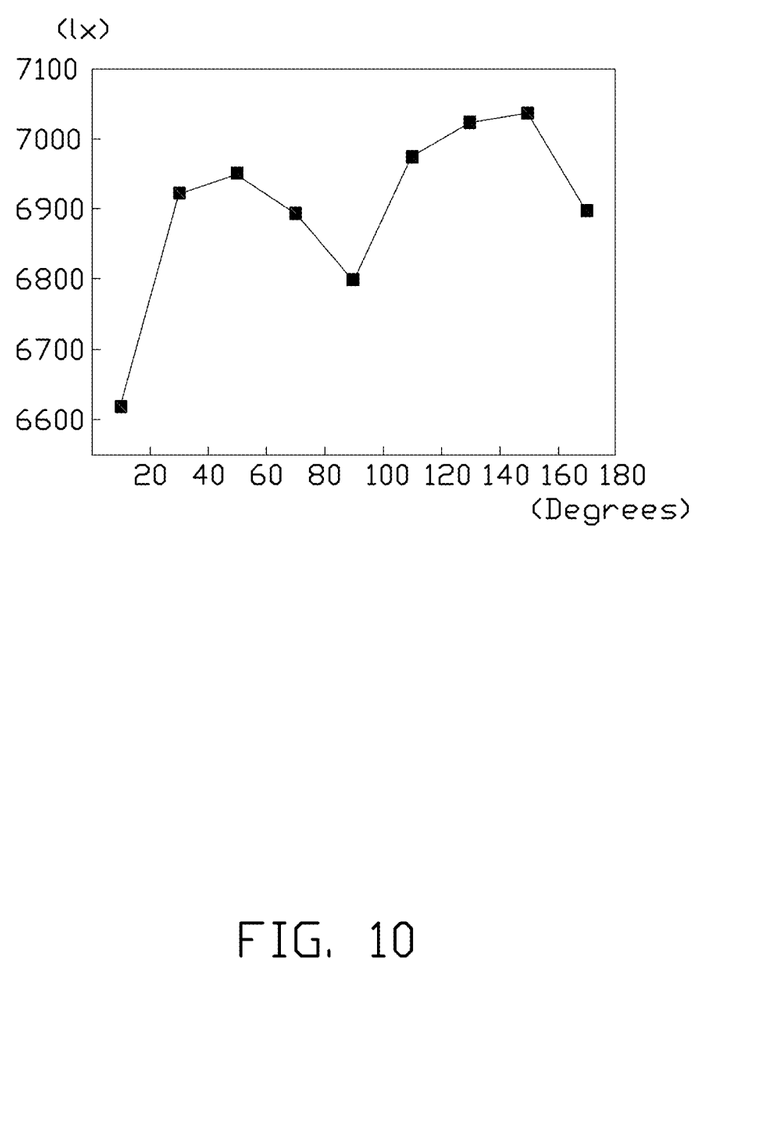
FIG. 10 is a chart showing the luminosity distribution of the illuminating device of FIG. 1.

FIG. 10 shows the luminosity distribution of the illuminating device 10 when the top angle θ of the triangular-shaped sectional surface of the second light guide projectors 306 is changed from about 10 degrees to about 170 degrees. It can be seen from FIG. 10 that the luminosity of the illuminating device 10 is high when the top angle θ is in the range of about 130 degrees to about 150 degrees.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A light source module, comprising:
a light source; and
a housing receiving the light source and comprising a transparent light emitting plate, wherein the transparent light emitting plate comprises an outer surface away from the light source and a micro structure positioned on the outer surface, the micro structure comprises a number of first light guide projectors and a number of second light guide projectors, the number of first light guide projectors are positioned at a middle part of the outer surface, the number of the second light guide projectors are positioned at two end parts of the outer surface beside the number of first light guide projectors, the number of the first light guide projectors and the number of the second light guide projectors extend along the outer surface and are substantially perpendicular to each other, a cross-sectional surface of each of the first light guide projectors substantially perpendicular to the extending direction of the number of first light guide projectors is semi-circular-shaped, and a cross-sectional surface of each of the second light guide projectors substantially perpendicular to the extending direction of the number of second light guide projectors is triangular-shaped.

2. The light source module of claim 1, wherein a radius of the cross-sectional surface of each of the first light guide projectors is in the range of about 0.04 micros to about 0.07 micros.

3. The light source module of claim 1, wherein a top angle of the cross-sectional surface of each of the second light guide projectors is in the range of about 130 degrees to about 150 degrees.

4. The light source module of claim 1, wherein the light source is a light emitting diode.

5. An illuminating device, comprising:
a light guide plate comprising a light incident surface; and
a number of light source modules adjacent to the light incident surface, each of the light source modules comprising:
a light source; and
a housing receiving the light source and comprising a transparent light emitting plate, wherein the transparent light emitting plate comprises an outer surface away from the light source and a micro structure positioned on the outer surface, the micro structure comprises a number of first light guide projectors and a number of second light guide projectors, the number of first light guide projectors are positioned at a middle part of the outer surface, the number of the second light guide projectors are positioned at two end parts of the outer surface beside the number of first light guide projectors, the number of the first light guide projectors and the number of the second light guide projectors extend along the outer surface and are substantially perpendicular to each other, a cross-sectional surface of each of the first light guide projectors substantially perpendicular to the extending direction of the number of first light guide projectors is semi-circular-shaped, and a cross-sectional surface of each of the second light guide projectors substantially perpendicular to the extending direction of the number of second light guide projectors is triangular-shaped.

6. The illuminating device of claim 5, wherein a radius of the cross-sectional surface of each of the first light guide projectors is in the range of about 0.04 micros to about 0.07 micros.

7. The illuminating device of claim 5, wherein a top angle of the cross-sectional surface of each of the second light guide projectors is in the range of about 130 degrees to about 150 degrees.

8. The illuminating device of claim 5, wherein the light source is a light emitting diode.

9. The illuminating device of claim 5, wherein the light guide plate comprises a light emitting surface.

10. The illuminating device of claim 5, further comprising a circuit board carrying the number of light source modules.

* * * * *